US006208259B1

United States Patent
Lemke

(10) Patent No.: US 6,208,259 B1
(45) Date of Patent: Mar. 27, 2001

(54) BASKET LEVEL INDICATOR FOR COTTON HARVESTER

(75) Inventor: Dwight D. Lemke, Geneseo, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/265,087

(22) Filed: Mar. 9, 1999

(51) Int. Cl.[7] .................................................. G08B 21/00
(52) U.S. Cl. .......................... 340/665; 340/666; 340/676; 340/679; 460/114; 460/115; 460/116; 460/119; 460/149; 56/16.4 R; 56/16.6; 56/28; 56/30
(58) Field of Search ..................................... 340/665, 666, 340/676, 679; 460/114, 116, 119, 115, 149; 56/16.4 R, 16.6, 28, 30

(56) References Cited

U.S. PATENT DOCUMENTS

| 5,065,569 | * | 11/1991 | Schlueter | ................................. | 56/16 |
| 5,427,572 | * | 6/1995 | Deutsch et al. | ....................... | 460/119 |
| 5,584,762 | * | 12/1996 | Buhler et al. | ......................... | 460/119 |
| 5,609,523 | * | 3/1997 | Ringwald et al. | .................... | 460/119 |
| 6,074,298 | * | 6/2000 | Majkrzak et al. | .................... | 480/119 |

\* cited by examiner

Primary Examiner—Daniel J. Wu
Assistant Examiner—Hung Nguyen
(74) Attorney, Agent, or Firm—Foley & Lardner

(57) ABSTRACT

An apparatus for indicating the level of harvested cotton in a basket assembly of a cotton harvester is provided. The apparatus includes a transducer, a control circuit and an indicator. The transducer is coupled to a motor of a compaction member of a compaction assembly of the cotton harvester and measures the pressure exerted by the harvested cotton upon the compaction member. The transducer generates a pressure signal that is received by the control circuit. The control circuit generates a basket level indication signal a short time after the pressure signal indicates a predetermined pressure has been measured. Alternatively, the control circuit generates the basket level indication signal when the pressure signal indicates the basket assembly is approximately full. An indicator, such as a lamp or buzzer, receives the basket level indication signal and provides an indication to the operator of the level of harvested cotton in the basket.

20 Claims, 8 Drawing Sheets

BASKET LEVEL INDICATOR FOR COTTON HARVESTER

FIELD OF THE INVENTION

The present invention relates generally to the field of cotton harvesters and more specifically to the field of cotton harvesters having an apparatus for indicating when harvested cotton in a basket assembly associated with the cotton harvester has reached a predetermined level.

BACKGROUND OF THE INVENTION

A cotton harvester is a vehicle driven across a field of cotton that picks the cotton and stores it for baling. Cotton harvesters generally include a header, a basket assembly and a cab. An operator in the cab operates the header to engage the cotton in the field. As the vehicle is driven at a slow speed (e.g., less than 4 miles per hour), the header picks the cotton, cleans the cotton, lubricates the cotton if necessary and propels the cotton up a duct into the basket assembly. The basket assembly holds the cotton until the cotton can be unloaded into a separate storage and/or packaging vehicle.

Frequent unloading of the basket assembly can waste valuable harvest time during operation of the cotton harvester. Accordingly, several modifications have been made to improve the amount of cotton that can be stored in the basket assembly. For example, the basket assembly has been made larger. The basket assembly also has been equipped with a telescoping structure to allow the operator to raise the basket assembly during harvesting to increase the total basket assembly capacity and lower the basket assembly during transportation. Also, compacting structures have been implemented in the basket assembly to compress the cotton so that more cotton can be held in the basket assembly.

Cotton is different than other harvested crops (e.g., corn, wheat, soybeans) in that it can be compacted to significantly increase the amount of cotton that can be stored in a defined space. Thus, the amount of cotton that the basket assembly can store is typically defined by the degree to which the cotton can be compacted. In turn, the degree to which the cotton can be compacted is typically defined by the upper limit of the force exerted by the compacting structure on the harvested cotton (and, of course, the equal and opposite force exerted by the harvested cotton on the compacting structure).

The compactability of cotton provides unique challenges for the operator when the operator attempts to determine if the basket assembly needs to be emptied (i.e., is "full"). The operator cannot determine from a simple glance at the basket assembly if the basket assembly is full because the degree of compaction cannot be accurately determined by looking at the basket assembly. Even to the extent that the degree of compaction can be determined by looking at the basket assembly, the operator is typically focused on operating the vehicle and cannot be disturbed by continually viewing the basket assembly. As a result, the operator must empty the basket assembly before it has reached its full or desired capacity, creating additional delays in harvesting time.

One proposed solution is an apparatus for compacting cotton in a basket assembly having an alarm. This apparatus has a manual mode of compaction and an automatic mode of compaction. During the automatic mode, hydraulically-driven augers located at the top of the basket assembly are continuously in motion, even when the augers are clear of any harvested cotton. A transducer is located in the hydraulic conduit of the augers to sense the hydraulic pressure exerted by the augers on the harvested cotton. As the level of harvested cotton increases, the cotton gathers around the augers and exerts a force thereon, causing an increase in the hydraulic pressure in the hydraulic conduit. When the pressure reaches a predefined threshold, a detection circuit triggers an alarm. This alarm indicates to the operator that the harvested cotton has reached the height of the augers in the basket assembly.

This solution merely indicates to the operator that the cotton has reached the height of the augers. The operator receives no indication of how compacted the harvested cotton is, and therefore receives no indication of how full the basket assembly is. Thus, what is needed is a cotton harvester with an improved basket level indicator that provides a clear indication to the operator when the harvested cotton in the basket assembly of the cotton harvester has reached a predetermined level.

SUMMARY OF THE INVENTION

These and other needs are accomplished by the present invention in which, according to one embodiment, an apparatus for indicating the level of harvested cotton in a basket assembly of a cotton harvester is provided. The apparatus includes a transducer, a control circuit and an indicator. The transducer is coupled to a motor of a compaction member of a compaction assembly of the cotton harvester and measures the pressure exerted by the harvested cotton upon the compaction member. The transducer generates a pressure signal that is received by the control circuit. The control circuit generates a basket level indication signal a short time after the pressure signal indicates a predetermined pressure has been measured. An indicator, such as a lamp or buzzer, receives the basket level indication signal and provides an indication to the operator of the level of harvested cotton in the basket assembly.

According to one feature of the present invention, the control circuit generates the basket level indication signal when the pressure signal indicates the basket assembly is approximately full.

According to another feature of the present invention, a timer input device is provided. The operator may adjust the timer input device to adjust the short time between the measured pressure reaching the predetermined pressure and the generation of the basket level indicator signal. In one embodiment, this timer input device allows the operator to select how much notice the operator will have before the basket assembly is full.

According to another embodiment of the present invention, a method of indicating the level of harvested cotton in a basket assembly of a cotton harvester is provided. The method includes the steps of: measuring a pressure exerted by the harvested cotton on a compaction member; generating a signal representative of the exerted pressure; generating a basket level indication signal when the pressure signal indicates the basket assembly is approximately full; and providing an indication of the level of harvested cotton in the basket assembly based on the basket level indication signal.

According to yet another embodiment of the present invention, a basket level indicator apparatus for a cotton harvester is provided. The apparatus includes means for measuring a pressure exerted by harvested cotton in a basket assembly on a compacting assembly coupled to the basket assembly, means for generating a signal representative of the measured pressure, means for generating a basket level indication signal when the pressure signal indicates the basket assembly is approximately full, and means for providing an indication of the level of harvested cotton in the basket assembly based on the basket level indication signal

BRIEF DESCRIPTION OF THE DRAWINGS

The features of the present invention which are believed to be novel are set forth with particularity in the appended claims. The invention itself, however, together with further advantages and features thereof may best be understood by one skilled in the art with reference to the following detailed description when taken in conjunction with the accompanying drawings in which like reference numerals refer to like elements, and in which:

DETAILED DESCRIPTION OF THE PREFERRED EMBODIMENTS

Figure 1:
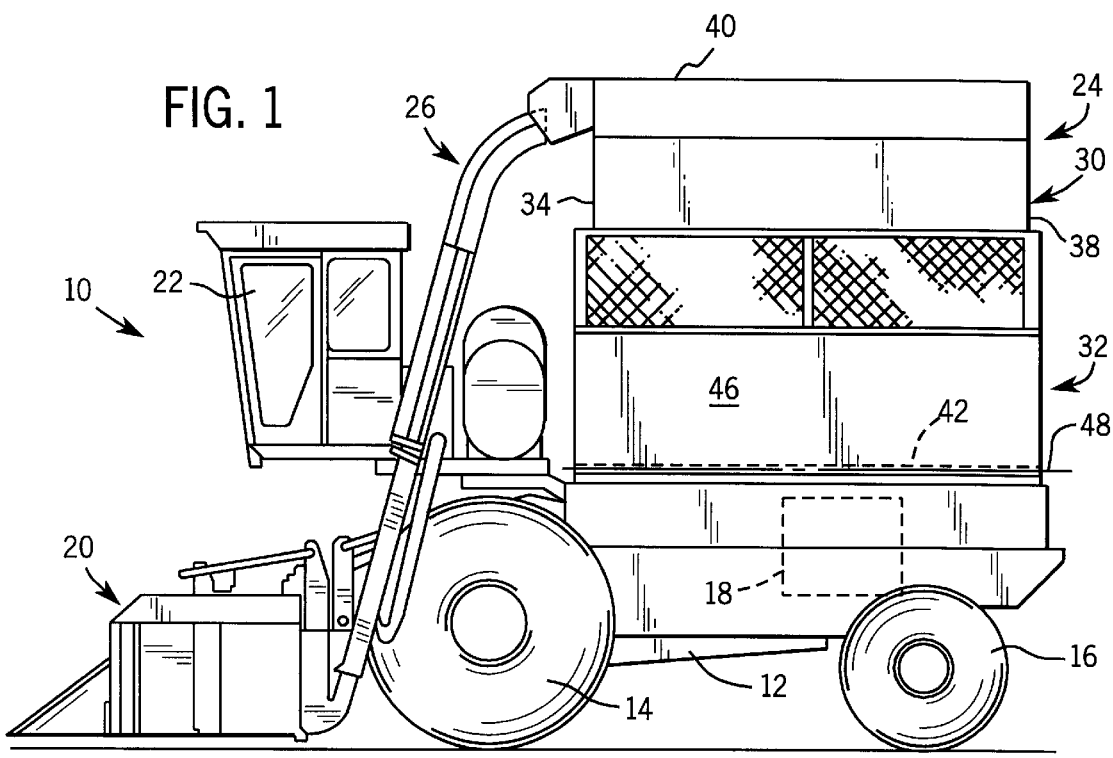
FIG. 1 is a side view diagram of a cotton harvester.

Referring first to FIG. 1, a cotton harvester 10 is shown. Cotton harvester 10 is the 2555 Cotton Express® Picker manufactured by Case Corporation, Racine, Wisconsin, but may alternatively be other cotton harvesters. Cotton harvester 10 includes a vehicle 12, front and rear wheels 14, 16, an engine 18, a header 20, a cab 22, a basket assembly 24 and a duct structure 26. During cotton harvesting, cotton harvester 10 is propelled along a cotton field by vehicle 12. Engine 18 drives front wheels 14 according to an operator-selected speed selected by an operator in cab 22. Vehicle 12 is also steered by the operator by a suitable steering device which operates rear wheels 16. The operator may also raise or lower header 20, the operator lowering header 20 at or near ground level during cotton harvesting.

As vehicle 12 drives harvester 10 along the cotton field, header 20 engages the cotton plants, picks the cotton from the cotton plants, cleans the cotton and moisturizes the cotton if necessary. This harvesting process can be controlled by the operator in cab 22 through use of suitable harvesting controls (not shown). The harvested cotton is then blown by a fan (not shown) up duct structure 26 into basket assembly 24 for storage.

Basket assembly 24 comprises several structures to improve the amount of harvested cotton that may be stored therein. For example, basket assembly 24 includes a top portion 30 and a bottom portion 32 coupled in a telescoping arrangement, top portion 30 having a front wall 34 and a rear wall 38. Thus, top portion 30 is extended either manually or automatically (operator control from cab 22) during or prior to cotton harvesting to increase the volume of basket assembly 24, and top portion 30 is retracted into bottom portion 32 prior to transportation of harvester 10 from one location to another (e.g., from one field to another). Top portion 30 further includes a top panel 40 providing a cover on basket assembly 24 and a floor 42. Also, basket assembly 24 comprises a compacting assembly 60 (FIG. 3) to compact the harvested cotton in basket assembly 24, thereby increasing the harvested cotton capacity of basket assembly 24. The compacting assembly will be described hereinbelow with reference to FIGS. 3–4.

Referring still to FIG. 1, basket assembly 24 includes a door 46 hingedly coupled to floor 42 of basket assembly 24. Door 46 may be opened by rotating door 46 about a door axis 48 to remove the harvested cotton from basket assembly 24. Alternatively or additionally, a hydraulic actuator assembly could by coupled between basket assembly 24 and vehicle 12 for elevating the entire basket assembly relative to the vehicle to facilitate removing the harvested cotton from basket assembly 24.

Figure 2:
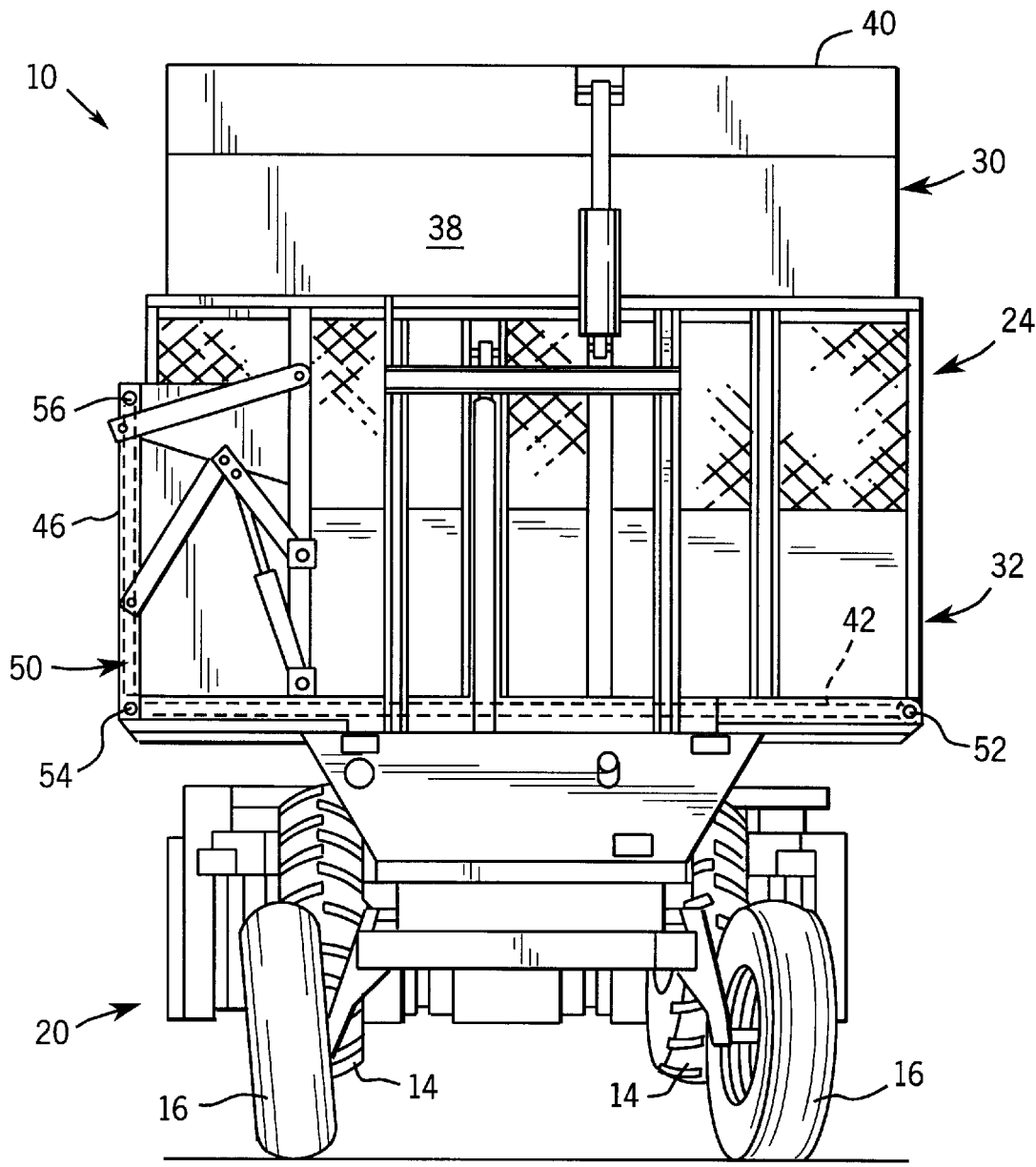
FIG. 2 is a rear view diagram of the cotton harvester of FIG. 1.

As shown in FIG. 2, a conveyor assembly 50 may be provided to assist in removing the harvested cotton from basket assembly 24. In this embodiment, floor 42 of basket assembly 24 is a conveyor belt rotatable about conveyor wheels 52, 54 and 56, one or more of which wheels is a driving wheel driven in a counter-clockwise direction from the rear view as depicted in FIG. 2. Thus, when door 46 is opened, the operator may engage the conveyor belt to assist in shifting the harvested cotton from basket assembly 24 out door 46.

Figure 3:
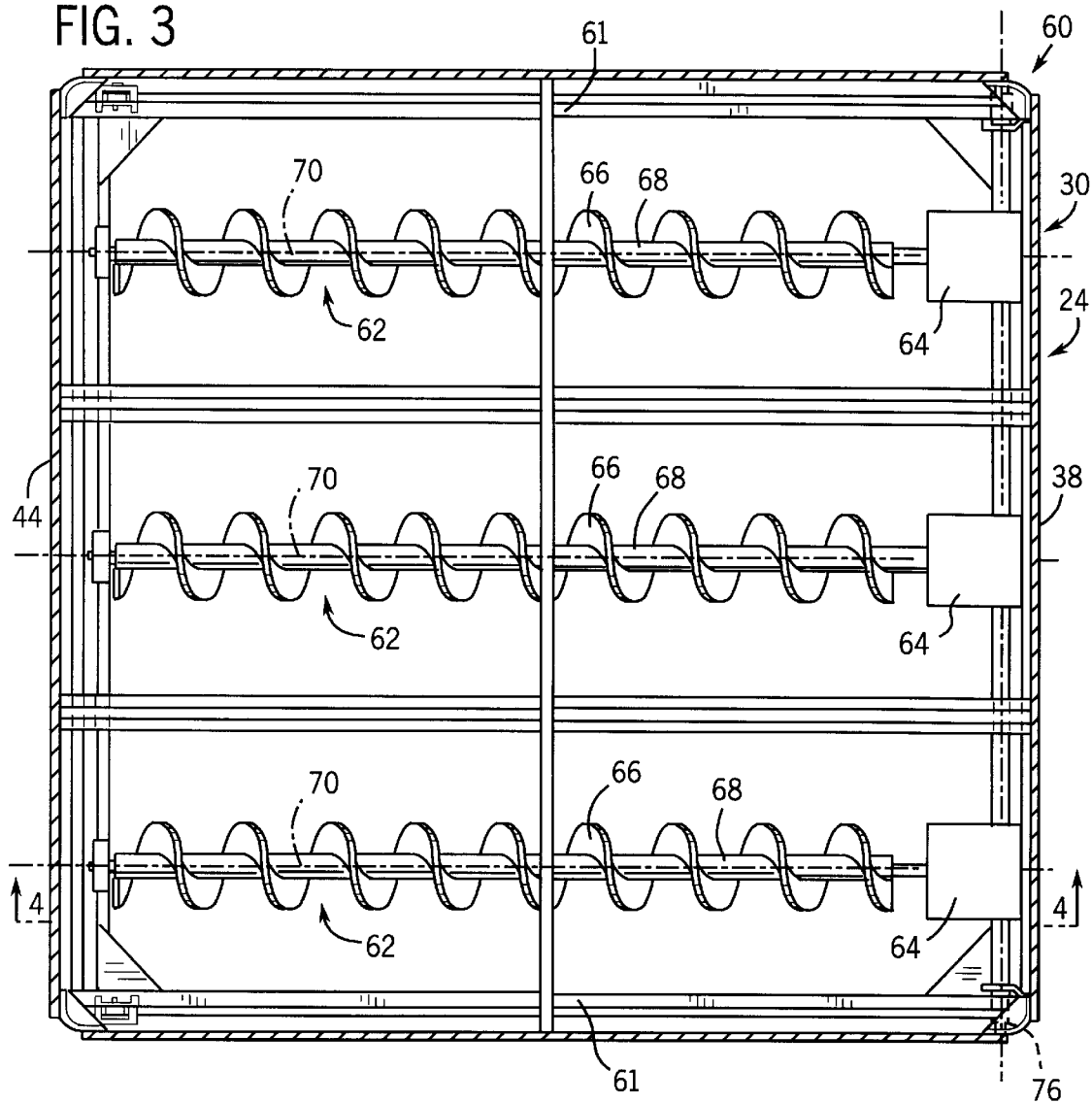
FIG. 3 is a top view diagram of the compacting assembly of the cotton harvester of FIG. 1.
Figure 4:
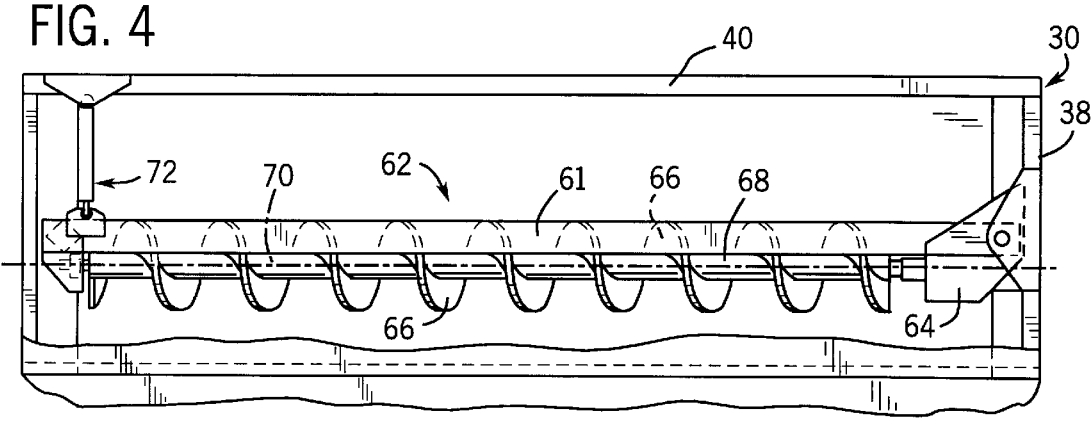
FIG. 4 is a side view diagram of the compacting assembly of the cotton harvester of FIG. 1.

Referring now to FIGS. 3–4, these figures show a compacting assembly 60 according to one embodiment of the present invention. Harvested cotton is unlike other harvested crops in that it is highly compactable in a given storage volume. Thus, to maximize the amount of harvested cotton that may be stored in basket assembly 24, it is advantageous to include a compacting assembly 60 or similar assembly to compress the harvested cotton. While an exemplary compacting assembly 60 is shown and will now be described, the present invention has applications with other compacting assemblies as well.

FIG. 3 is a top view of basket assembly 24 with top panel 40 removed. Compacting assembly 60 includes a frame 61 and one or more compaction members 62, each compaction member 62 coupled to rear wall 38 of basket assembly 24 by motors 64. Motors 64 are hydraulic motors, but may also be electrostatic motors, electric motors, DC motors, servo motors, etc. Compaction members 62 in this embodiment are augers or other helical-shaped members having fin portions 66 and shaft portions 68, shaft portions 68 extending from motors 64 across basket assembly 24 to front wall 44 along compaction member axes 70. Motors 64 engage shaft portions 68 in counterclockwise rotational motion causing fin portions 66 to exert forces away from motors 64 on any harvested cotton that may come in contact with fin portions 66.

Referring to FIG. 4, compacting assembly 60 further includes an actuator assembly 72 coupling top panel 40 to frame 61. Actuator assembly 72 extends compacting assembly 60 downward while compacting assembly 60 remains hingedly coupled to rear wall 38. Thus, compacting assembly 60 rotates about a compacting assembly axis 76 (FIG. 3). As compaction members 62 extend downward into basket assembly 24 and as motors 64 rotate compaction members 62, harvested cotton in basket assembly 24 is compressed downward toward floor 42 of basket assembly 24. This compression exerts a force against fin portions 66 which is transferred as rotational torque via shaft portions 68 to motors 64. This rotational torque causes a measurable pressure change in motors 64. As basket assembly 24 is filled with more harvested cotton, the pressure change will increase, providing an indication of the level of harvested cotton in basket assembly 24 (e.g., how "full" basket assembly 24 is).

Figure 5A:
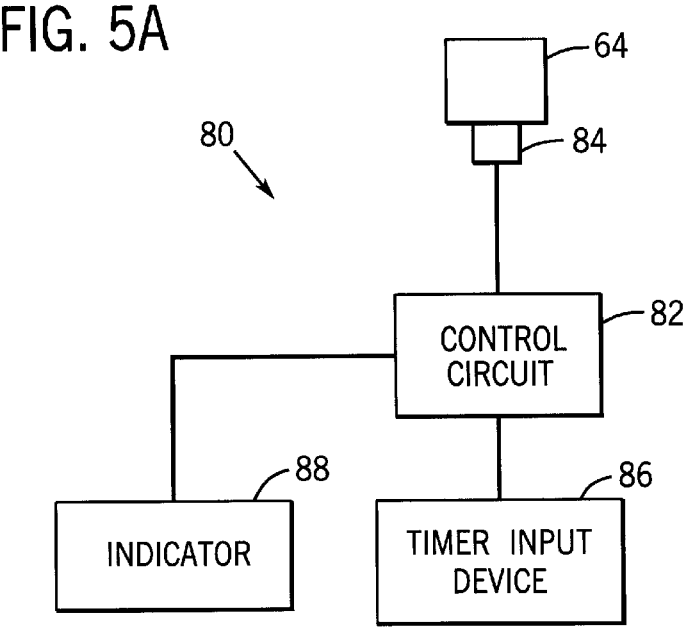
FIG. 5A is a block diagram of a basket level indicator apparatus according to one embodiment of the present invention.

Referring now to FIG. 5A, a basket level indicator apparatus 80 according to one embodiment of the present invention is shown. In this embodiment, basket level indicator apparatus is shown coupled to one of motors 64. Apparatus 80 includes a control circuit 82, a transducer 84, a timer input device 86 and an indicator 88. Transducer 84 (e.g., a transducer such as Case Corporation Part No. 194407A2, manufactured by Sigma-netics) is coupled to motor 64 such that transducer 84 measures the above-described pressure change in motor 64 caused by harvested cotton impinging on fin portions 66 of compaction members 62 and generates a pressure signal 83 (see FIG. 5B) having an electrical signal representative of the measured pressure. For example, if motor 64 is a hydraulic motor, transducer 84 is located in the hydraulic conduit of the hydraulic motor to sense the hydraulic pressure in the conduit. This hydraulic pressure represents the force exerted by the hydraulic motor on compaction members 62 and on the harvested cotton (and, of course, the equal and opposite force exerted by the harvested cotton on compaction members 62 and on the hydraulic motor.) In another embodiment, motor 64 is an electric motor having a power source, transducer 84 is a power transducer to monitor the power applied to the motor (e.g., current, voltage, energy, etc.) such that the pressure signal is a signal representative of motor torque. An example of a suitable power transducer is Case Part No. 194407A2 manufactured by Sigma-netics.

Transducer 84 includes a grounded pressure-activated contact switch coupled to a voltage source having a predetermined voltage (e.g., +12 Volts DC), such that transducer 84 generates a signal of a first state (e.g., zero VDC) when the measured pressure drops below a first predetermined pressure threshold (e.g., about 850 pounds per square inch or "PSI") and a signal of a second state (e.g., +12 VDC) when the measured pressure rises above a second predetermined threshold (e.g., about 1100 PSI). Thus, transducer 84 has hysteresis characteristics. Alternatively, transducer 84 could generate a pulse-width modulated signal, a frequency modulated signal, an amplitude modulated signal, or any other type of signal representative of the actual pressure measured by transducer 84. Transducer 84, in one embodiment, is coupled to a hydraulic fluid conduit supplying fluid to a plurality of motors 64, all of motors 64 coupled in series to the same conduit. An alternative to transducer 84 is two or more sensors, each coupled to one of motors 64, each of sensors 84 providing a pressure signal to control circuit 82, whereby control circuit 82 could assess more accurately whether basket assembly 24 is full by combining pressure signals received from motors 64 (e.g., averaging) or by waiting until all pressure signals have reached the predetermined pressure threshold before changing or generating pressure signal 83.

A suitable sensor must be selected for transducer 84 having a pressure threshold such that the pressure exerted by the harvested cotton on compaction members 62 triggers transducer 84 to the second state sometime before a maximum pressure of motors 64 is reached or basket assembly 24 is full. This time will provide the operator with an opportunity to empty basket assembly 24 before the maximum pressure of motors 64 is reached or basket assembly 24 is overpacked. According to the present invention, this time also provides the operator with sufficient time to finish harvesting a row or simply to know in advance how long until motors 64 reach their maximum rotating power (i.e., when basket assembly 24 is full). Alternatively, transducer 84 could generate pressure signal 83 to provide a continuous indication of the measured pressure to control circuit 82 and control circuit 82 could either determine, based on pre-defined thresholds or user input, at what pressure basket assembly 26 is full or control circuit 82 could generate a basket level indication signal which provides a continuous indication (via indicator 88) of measured pressure.

Transducer 84 transmits pressure signal 83 to control circuit 82. Control circuit 82 is a timer module configured to generate a basket level indication signal 91 based on the received pressure signal 83. Control circuit 82 may alternatively be any type of digital or analog control circuitry (e.g., a Motorola or Intel microprocessor, application-specific integrated circuit, etc.) configured to perform a variety of control operations.

Timer input device 86 may be a switch, dial, series of buttons, icon on a computer screen, or other input device which receives input from the operator regarding how much notice the operator would like before basket assembly 24 is full. Timer input device 86 provides a control signal representative of this input to control circuit 82. Timer input device 86 may include additional operator adjustable functions.

Indicator 88 may be a lamp, buzzer, icon on a computer screen, or other indicator on an instrument panel. Indicator 88 receives a signal from control circuit 82 to indicate to the operator the fill level of basket assembly 24, and to indicate to the operator that basket assembly 24 will be "full" in a defined period of time, as described in greater detail hereinbelow.

Figure 5B:
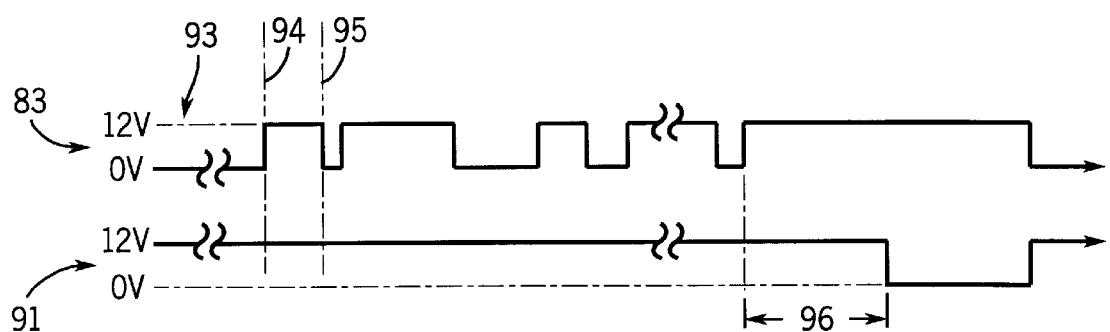
FIG. 5B is a timing diagram for the apparatus of FIG. 5A.

With reference to FIG. 5B, a timing diagram illustrates the operation of apparatus 80 according to one exemplary embodiment of the present invention. Control circuit 82 receives pressure signal 83 which, in this embodiment, alternates between the first state and the second state depending on whether the measured pressure moves below the first predetermined pressure threshold or moves above the second pressure threshold, respectively. When basket assembly 24 is empty and the harvesting has first begun (time 93), basket assembly 24 is filled for a period of time (e.g., about 7 minutes) during which compaction members 62, which are constantly rotating, are substantially free of harvested cotton. After this period of time, harvested cotton begins to fill basket assembly 24 to a point where it exerts a pressure on compaction members 62. When the pressure exceeds the second predetermined threshold, transducer 84 switches pressure signal 83 from the first state to the second state (time 94). During this time, compacting assembly 60 moves down into basket assembly 24 to compact the harvested cotton and returns, which takes approximately 3 seconds. Upon return of compacting assembly 60 (time 95), the pressure exerted on compaction members 62 decreases to below the first predetermined threshold, causing signal 83 to switch back to the first state.

This process repeats somewhat periodically for approximately 3 to 5 minutes until compaction members 62 can no longer compress the harvested cotton to a point where the pressure exerted on compaction members 62 drops below the first predetermined threshold. When pressure signal 83 fails to switch to the second state for a predetermined time 96, control circuit 82 changes the state of signal 91 sent to indicator 88. Indicator 88 provides a light, buzzer or other indicator to the operator in the cab to indicate that the predetermined time 96 has passed. This indication tells the operator that basket assembly 24 will be full or approximately full in a certain amount of time. Timer input device 86 adjusts predetermined time 96 from, for example, 20 seconds to 5 minutes. The lower predetermined time 96 is set, the more time the operator will have before basket assembly 24 is full, allowing the operator to finish a row, finish a field, etc. The higher predetermined time 96 is set, the less time the operator will have before basket assembly 24 is full. (Typically, basket assembly 24 will be full after 10 to 15 minutes of harvesting.) Alternatively, timer input device 86 can be adjusted to select not predetermined time 96 but rather the amount of time until basket assembly 24 is expected to be full, as calculated by control circuit 82. In a further alternative embodiment, the operator could use timer input device 86 to select at what percentage of basket full the operator would like to receive an indication on indicator 88. For example, the operator could select 80% on timer input device 86. Then, when control circuit 82 determines that basket assembly 24 is approximately 80% full based on known and measured conditions, control circuit 82 would send a signal to indicator 88 to alert the operator.

Figure 6:
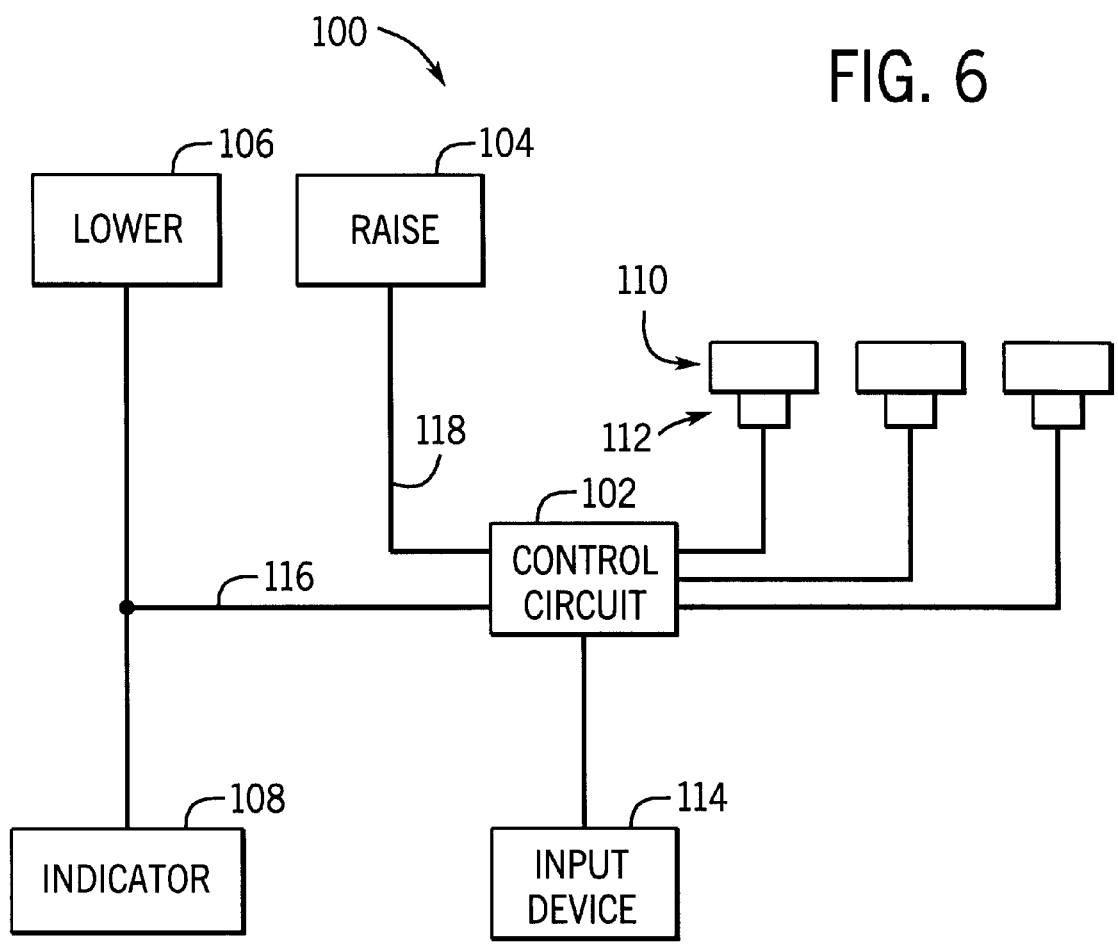
FIG. 6 is a block diagram of a basket level indicator apparatus according to an alternate embodiment of the present invention.

Referring now to FIG. 6, a basket level indicator apparatus 100 according to an alternative embodiment of the present invention is shown. Apparatus 100 includes a control circuit 102, a raise compactor solenoid 104, a lower compactor solenoid 106, an indicator 108, a plurality of compactor motors 110, each compactor motor 110 having a sensor 112 associated therewith, and an input device 114. Control circuit 102 is coupled to sensors 112 which are each coupled to one of compactor motors 110. It is understood that apparatus 100 could have only one motor 110 and sensor 112 or could have one sensor 112 in a hydraulic conduit supplying a plurality of motors 100. Sensors 112 each sense the pressure exerted by the harvested cotton upon motors 110 and each provide a signal representative of this sensed pressure to control circuit 102. Sensors 112 are pressure switches which generate a digital signal depending on whether the sensed pressure has dropped below a first threshold or exceeded a second threshold, but sensors 112 could alternatively be other types of transducers indicating pressure thresholds or instantaneous pressure. Control circuit 102 receives the signals from sensors 112 and generates a determination of how full basket assembly 24 is based upon one or more of these signals. For example, control circuit 102 could determine that the pressure exerted on motors 110 has reached the first or second threshold when one, two or three of sensors 112 have so indicated, or when the average pressure sensed by the three sensors so indicates.

Control circuit 102 is also coupled to a raise compactor solenoid 104 and a lower compactor solenoid 106. When control circuit 102 determines that the harvested cotton must be compacted based on signals received from sensors 102, it engages lower compactor solenoid 104 by sending a first signal of a first state (e.g., +12 VDC) along bus 116 to lower compactor solenoid 106. When compacting assembly 60 is completely extended, control circuit 102 switches the first signal to a second state (e.g., 0 VDC) and sends a second signal along bus 118 to engage compactor solenoid 104 to raise compacting assembly 60. One cycle of compacting assembly 60 lowering and raising is a single compactor stroke. Control circuit 102 determines the need to lower compactor assembly 60 via the first and second predetermined threshold method described above with respect to FIGS. 5A and B. Alternatively, other methods of determining the need to lower assembly 60 may be used.

Control circuit 102 is also coupled to indicator 108 via bus 116. When the first signal is in its first state, it also enables indicator 108, which may be a light, buzzer, or other indicator in cab 22 of vehicle 12 to indicate to the operator that compacting assembly 60 is lowering. Thus, when compacting assembly 60 is in the lowering portion of the compactor stroke, indicator 108 is enabled. When compacting assembly 60 is in the raising portion of the compactor stroke, indicator 108 is disabled. Accordingly, the operator in cab 22 receives an indication of the frequency with which compacting assembly 60 cycles through compactor strokes. As control circuit 102 increases the rate of compactor strokes, the operator is aware that basket assembly 24 is filling up. Finally, when control circuit 102 is constantly lowering compacting assembly 60, the operator knows that basket assembly 24 is full or approximately full. Of course, control circuit 102 could alternatively enable indicator 108 only on the raise portion of the compactor stroke, or during both raise and lower portions of the compactor stroke.

Input device 114 is optionally provided to allow the operator to select between a number of options for indicating the level of basket assembly 24. For example, the operator may select how many of sensors 112 will be considered in determining when to begin a compactor stroke. The operator may also select whether an indication is provided on every lowering portion of the compactor stroke, every raising portion of the compactor stroke, during both portions, or intermittently between compactor strokes. In this way, the indication provided by indicator 108 may be tailored for the desires of specific operators. Also, the operator may use input device 114 to select between a first indication (e.g., a lamp) during the lowering portion of the compactor stroke and a second indication (e.g., a buzzer) when the control circuit 110 determines that basket assembly 24 is full or approximately full. Yet another alternative embodiment includes control circuit 102 counting the frequency with which lower compactor solenoid 106 is engaged and generating a basket full indicator signal when the frequency reaches a predetermined frequency.

Figure 7:
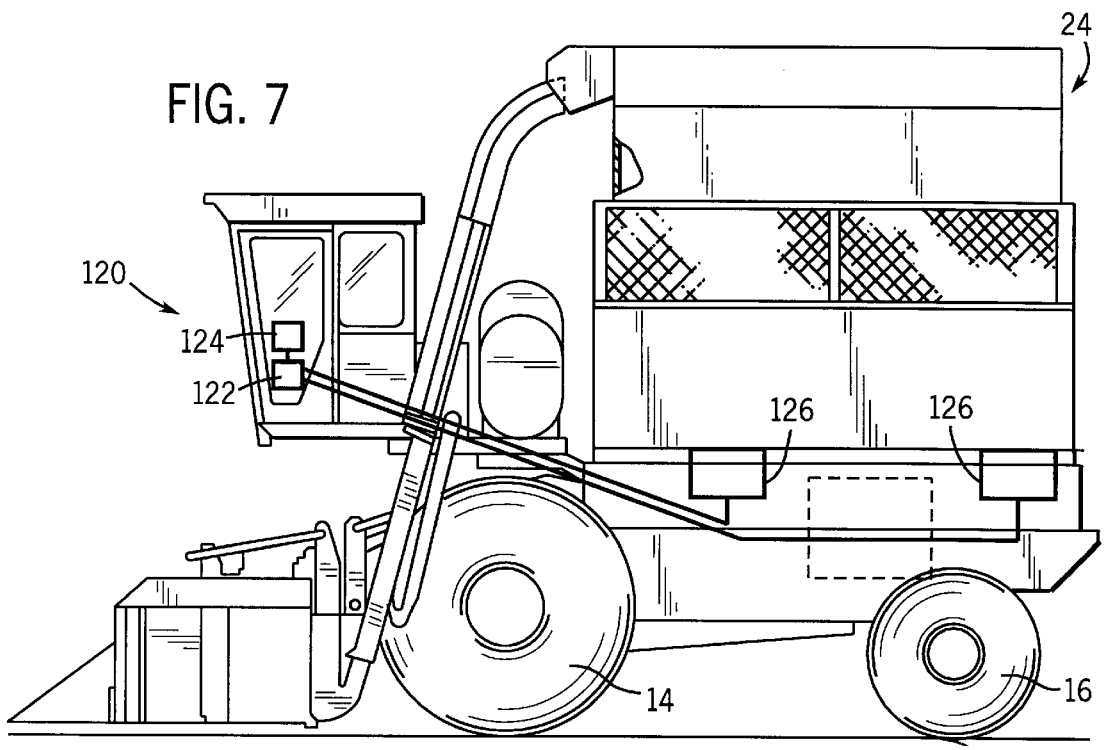
FIG. 7 is a side view diagram of a cotton harvester having a basket level indicator apparatus according to another alternate embodiment of the present invention.

Referring now to FIG. 7, a basket level indicator apparatus 120 according to an alternative embodiment of the present invention is shown. Apparatus 120 determines the level of harvested cotton in basket assembly 24 based on the weight of the harvested cotton. Apparatus 120 includes a control circuit 122, an operator interface 124, and one or more sensors 126. Control circuit 122 is coupled to and receives signals from sensors 126. Sensors 126 are transducers (e.g., load cells such as Part No. 65058 manufactured by Sensortronics), but may alternatively be other types of sensors configured to sense the weight of basket assembly 24. Sensors 126 are coupled between basket assembly 24 and vehicle 12 such that the weight of basket assembly 24 and, in particular, the weight of harvested cotton in basket assembly 24 may be sensed. Sensors 126 may measure the weight of the entire basket assembly 24 in which case control circuit 122 subtracts a known weight of basket assembly 24 from the measured weight to find the weight of harvested cotton in basket assembly 24. Alternatively, sensors 126 may be placed at various locations on and about basket assembly 24 (e.g., between wheels 14 and/or 16 and vehicle 12) provided that sensors 126 are in a position to sense the weight of harvested cotton in basket assembly 24.

Control circuit 122 is further coupled to an operator interface 124 having an indicator and an input device (not shown). The indicator provides a visible or audible indication to the operator of the level of harvested cotton in basket assembly 24. For example, the indicator could indicate only when basket assembly 24 is full, or the indicator could indicate the instantaneous level of harvested cotton in basket assembly 24. Control circuit 122 may optionally include an input device to receive operator input to select, for example, between receiving an indication of basket full or instantaneous basket level, or to select at what percentage of basket full the basket full indicator should be enabled. Also, the input device could be configured to receive a time period before basket assembly 24 is completely full at which the operator would like to receive the indication, in order to give the operator sufficient time to finish a row, or otherwise plan ahead.

In operation, control circuit 122 monitors the weight of harvested cotton in basket assembly 24 via one or more sensors 126. Control circuit 122 compares the sensed weight to a predetermined weight representative of a maximum weight of harvested cotton basket assembly 24 may hold. The predetermined weight is based on known characteristics of vehicle 12 such as the volume of basket assembly 24 in its extended state (e.g., 1,150 cubic feet in the 2555 Cotton Express® Picker) and the limits of compacting assembly 60 and compaction motors 64. The 2555 Cotton Espresso Picker has a weight capacity of approximately 8,500 pounds of harvested cotton. When control circuit 122 determines that basket assembly 24 is full or approximately full, control circuit 122 sends a signal to operator interface 124 to indicate the level of harvested cotton in basket assembly 24 to the operator. Alternatively, control circuit 122 may periodically send a signal to interface 124 indicating the instantaneous level of cotton in basket assembly 24, interface 124, in turn, indicating this directly to the operator.

Figure 8A:
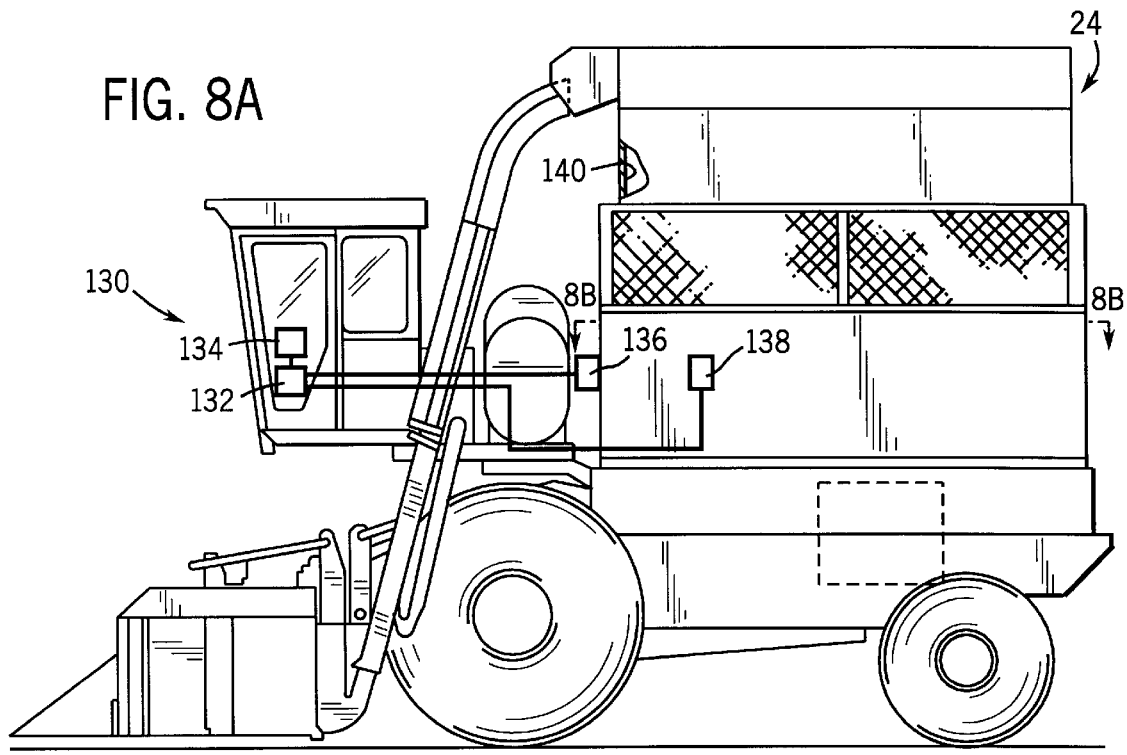
FIG. 8A is a side view diagram of a cotton harvester having a basket level indicator apparatus according to yet another alternate embodiment of the present invention.
Figure 8B:
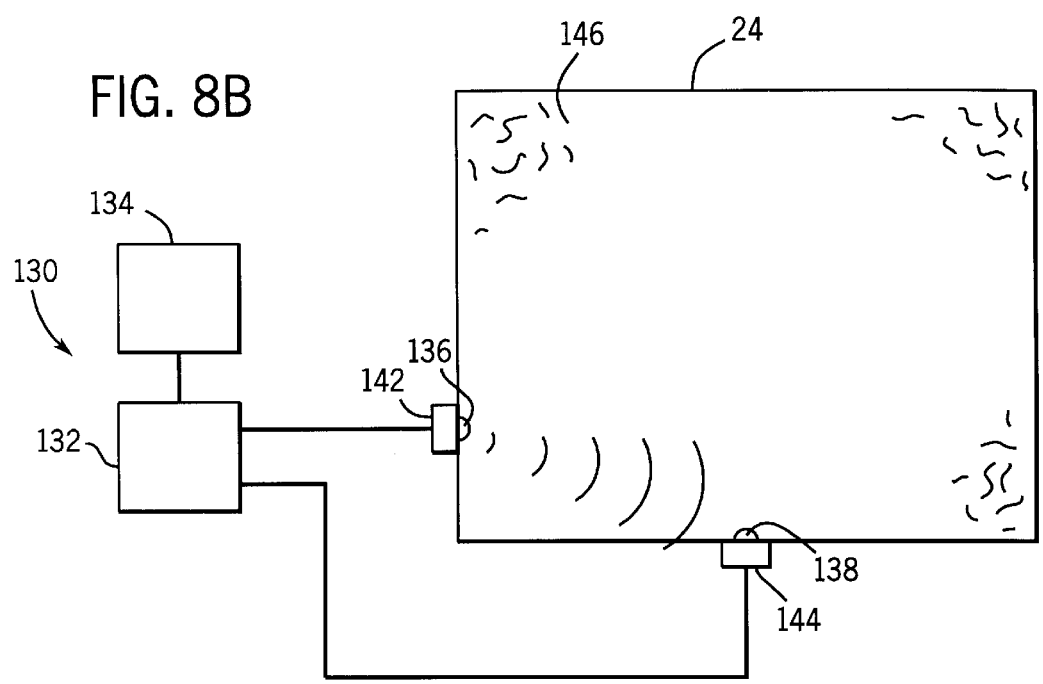
FIG. 8B is a block diagram of the cotton harvester of FIG. 8A.

Referring now to FIGS. 8A and 8B, a basket level indicator apparatus 130 according to an alternate embodiment of the present invention is shown. Apparatus 130 determines the level of harvested cotton in basket assembly 24 based on the density of the harvested cotton. As indicated previously, cotton is unlike other harvested crops in that it can be compacted to significantly increase the amount of cotton that can be stored in a defined space. In cotton harvester 10, compacting assembly 60 compacts the harvested cotton as it is gathered in basket assembly 24. The density of this compacted cotton can be measured to give an indication to the operator of cotton harvester 10 of how full basket assembly 24 is.

Apparatus 130 includes a control circuit 132, an operator interface 134, a first transducer 136 and a second transducer 138. Control circuit 132 is coupled to first transducer 136 and second transducer 138. These transducers are ultrasonic or acoustic transducers, first transducer 136 configured to transmit an ultrasonic signal and second transducer 138 configured to receive the ultrasonic signal. Transducers 136 and 138 may be, for example, Part No. 945-F4Y-2D-001-180E manufactured by Honeywell, or may be any other type of transducer that can detect the density of a substance by, for example, the attenuation of the signal from one point to another (e.g., an optic or infrared transducer and infrared light source). Transducers 136, 138 are mounted on an interior surface 140 of basket assembly 24 as shown with greater detail in FIG. 8B. A suitable mounting device 142, 144 is used to mount each transducer 136, 138, respectively, to basket assembly 24. Transducers 136, 138 are mounted on adjacent sides of basket assembly 24 such that a signal transmitted between transducers 136, 138 travels through a portion of harvested cotton 146. Transducers 136, 138 may alternatively be mounted in other locations (e.g., opposite sides of basket assembly 24) provided that a portion of harvested cotton 146 is between transducers 136, 138. Yet another alternative embodiment is to have only one transducer operating as both a transmitter and a receiver, the transmitted signal being reflected off an opposite wall of basket assembly 24 or off a reflector plate inserted into harvested cotton 146 near the transducer.

Control circuit 132 is also coupled to an operator interface 134 having an indicator and an input device (not shown). Operator interface 134 may include a number of indicators and display options, the display options being adjusted by the input device.

In operation, control circuit 132 sends a transmit signal to first transducer 136. The signal is a digital pulsed signal with sufficient amplitude to excite the crystal of transducer 136. Transducer 136, in response, generates an ultrasonic or acoustic signal and transmits the ultrasonic signal through a portion of harvested cotton 146. This ultrasonic signal is received by transducer 138 and sent to control circuit 132 for processing. Alternatively, transducer 138 could include signal processing circuitry that conditions the received signal for further processing by control circuit 132. The received signal is sent to control circuit 132 which evaluates the density of the portion of harvested cotton 134 based on the attenuation of the transmitted signal through the harvested cotton. Control circuit 132 then provides an indication to the operator of the level of harvested cotton in basket assembly 24 via operator interface 134.

Figure 9A:
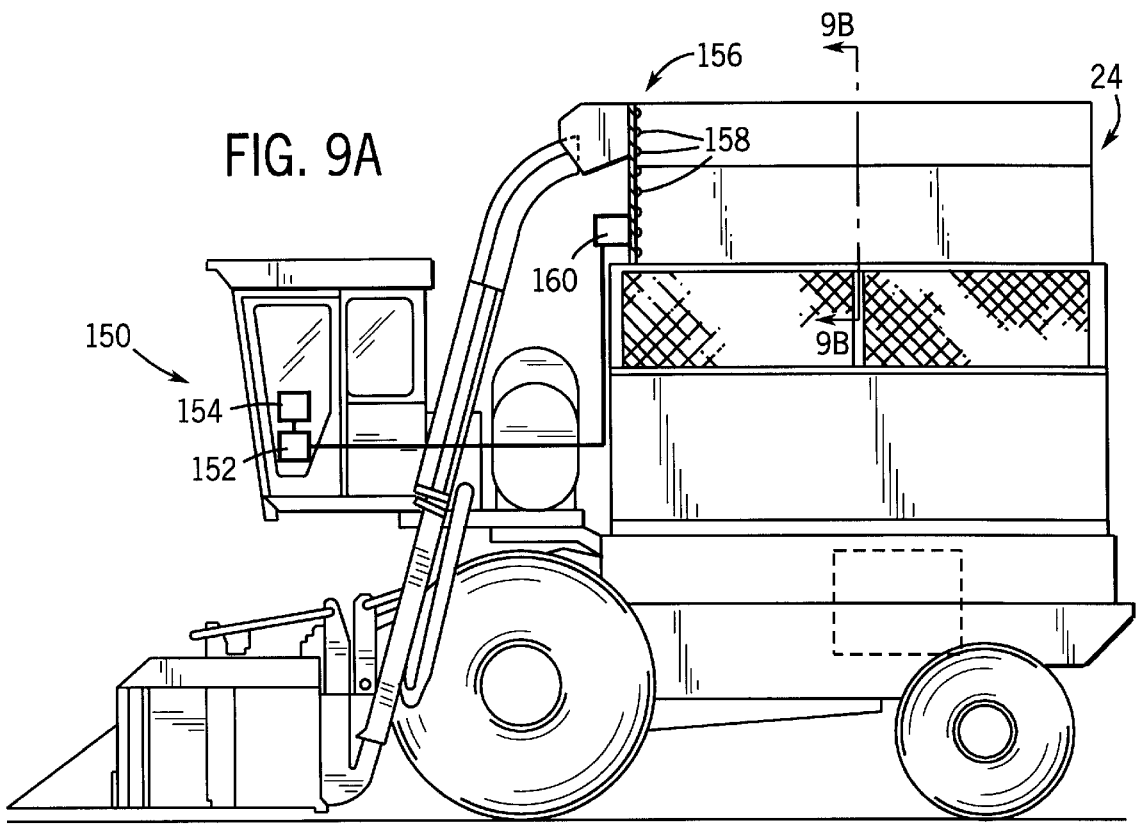
FIG. 9A is a side view diagram of a cotton harvester having a basket level indicator apparatus according to yet another alternate embodiment of the present invention.
Figure 9B:
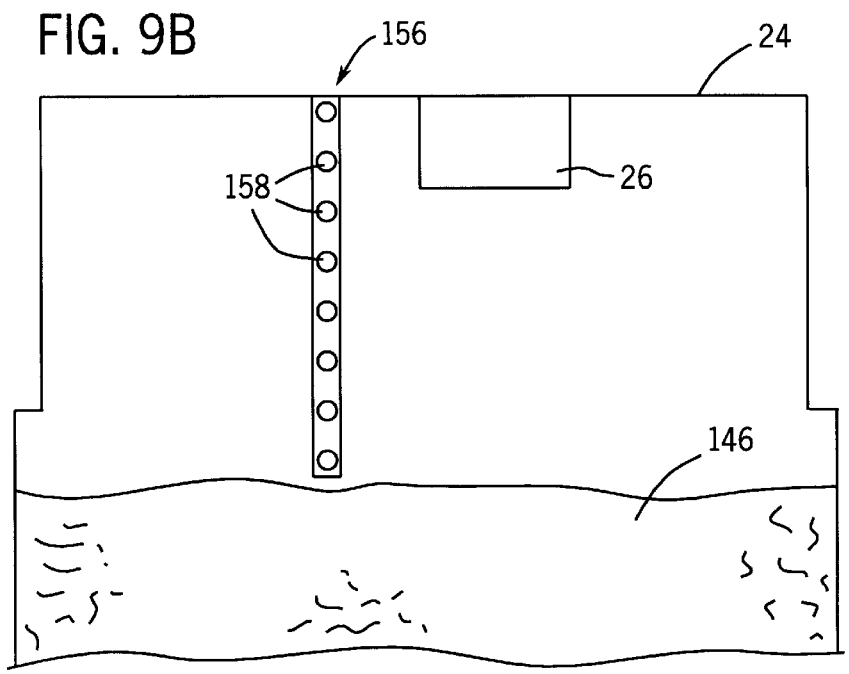
FIG. 9B is a partial rear view diagram of the cotton harvester of FIG. 9A.

Referring now to FIGS. 9A and 9B, a basket level indicator apparatus 150 according to an alternate embodiment of the present invention is shown. Apparatus 150 senses the height of harvested cotton stored in basket assembly 24 to give an indication to the operator as to how full basket assembly 24 is. Apparatus 150 includes a control circuit 152, an operator interface 154 and a sensor assembly 156. Control circuit 152 is coupled to and receives signals from sensor assembly 156 representing the height of harvested cotton in basket assembly 24. Sensor assembly 156 includes a plurality of light-sensitive transducers 158 sensitive to ambient light, each transducer 158 located at a different height in basket assembly 24. Sensor assembly 156 also includes a mounting assembly 160. Transducers 158 may be, for example, Part No. X111594-SVP infrared sensors manufactured by Honeywell. Alternatively, transducers 158 may be acoustical sensors to measure the reflection of a sound wave off nearby harvested cotton 146. Another alternative to transducers 158 is a multi-position switch having a plate for engaging the harvested cotton when the harvested cotton rises above a predetermined level. An alternative to sensor assembly 156 is an assembly having a single transducer 158 located at a selected height, said height indicating a height of harvested cotton 146 corresponding to a full state of basket assembly 24.

Control circuit 152 is also coupled to an operator interface 154 having an indicator and an input device (not shown). Operator interface 134 may include a number of indicators and display options adjustable by the input device.

In operation, control circuit 152 monitors transducers 158 of sensor assembly 156. As harvested cotton 146 is propelled through duct structure 26 into basket assembly 24, the level of harvested cotton 146 in basket assembly 24 will rise. Each transducer 158 is continuously monitoring the presence or absence of ambient light in its vicinity. As harvested cotton 146 rises to the bottom of sensor assembly 156, the lowest of transducers 158 is covered with cotton, preventing ambient light from reaching the lowest of transducers 158. The lowest of transducers 158 then sends a signal to control circuit 152 indicating that harvested cotton 146 has reached its level. As harvested cotton 146 continues to rise, successively higher transducers 158 are covered with harvested cotton 146. Each transducer 158 covered with harvested cotton 146 no longer senses the presence of ambient light and consequently sends a signal to control circuit 152 indicating that harvested cotton 146 has reached its level. It is recognized that cotton harvesters may be adapted for operation after sun-down when little or no ambient light is available. In such situations, a lamp or other light source (not shown) is provided on or near basket assembly 24 to provide the necessary ambient light to ensure proper functionality of light-sensitive transducers 158 in the embodiment of FIGS. 9A and 9B.

In response to signals received from sensor assembly 156, control circuit 152 generates a basket level indication signal and transmits this signal to operator interface 154. In response, operator interface 154 displays to the operator the level of harvested cotton in any one of a number of formats: instantaneous level of harvested cotton, an indication that basket assembly 24 is full, or an indication that basket assembly 24 will be full in a predetermined amount of time. The format of this display can be controlled by a suitable input device (not shown) on operator interface 154. For example, operator interface 154 could display a series of light-emitting diodes (LEDs) in a vertical row, one LED corresponding to each transducer 158. In this embodiment, the operator can monitor the level of harvested cotton. Naturally, as the harvested cotton is compacted, the level will decrease, and as the harvested cotton continues to fill basket assembly 24, the level will increase. Thus, the operator can view the series of LEDs and determine an approximate time when basket assembly 24 will require unloading.

Alternatively, sensor assembly 156 may include control circuitry sufficient to monitor transducers 158 and generate an indication of the level of harvested cotton 146 in basket assembly 24. In this embodiment, control circuit 152 merely receives a basket level indication signal from sensor assembly 156 and transmit this signal to operator interface 154 for display to the operator.

Figure 10:
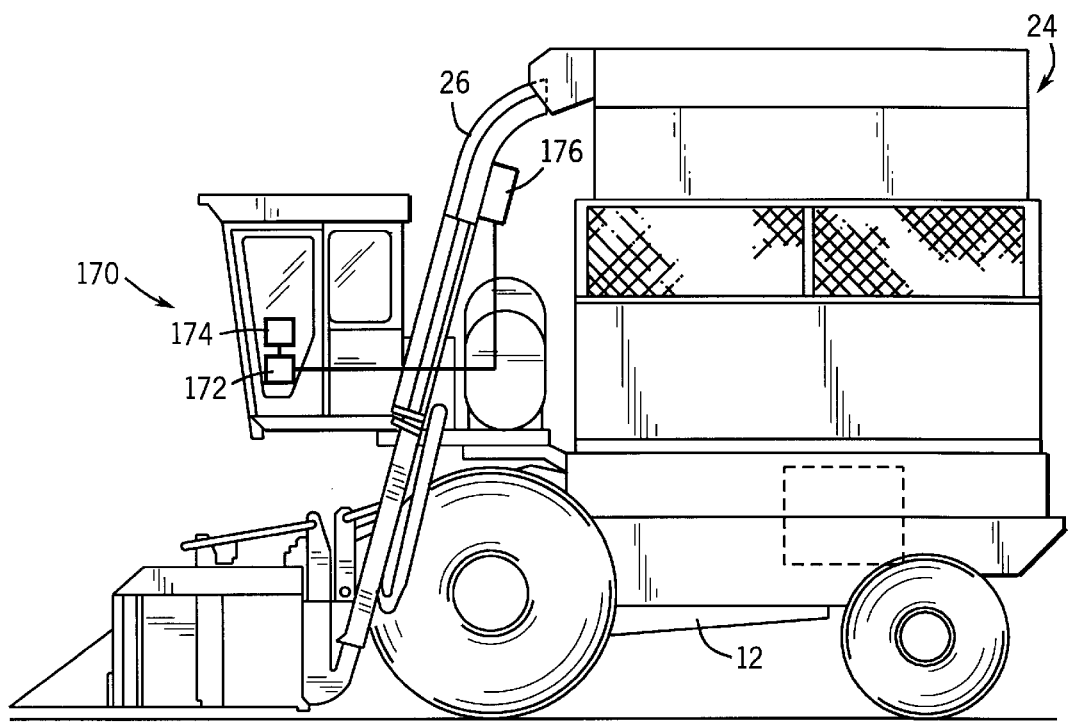
FIG. 10 is a side view diagram of a cotton harvester having a basket level indicator apparatus according to yet another embodiment of the present invention.

Referring now to FIG. 10, a basket level indicator apparatus 170 according to an alternative embodiment of the present invention is shown. Apparatus 170 monitors volume of harvested cotton in basket assembly 24. Apparatus 170 includes a control circuit 172, an operator interface 174 and a flow transducer 176. Control circuit 172 is coupled to flow transducer 176. Flow transducer 176 is coupled to one of header 20, duct structure 26 and basket assembly 24 in a position whereby the flow of harvested cotton can be monitored. Flow transducer 176 is a cotton flow transducer, Part No. 224597A3 manufactured by Case Corporation, but may be other types of cotton flow sensors. Flow transducer 176 may be mounted at various locations on vehicle 12 provided it is in a position to monitor the flow or volume of harvested cotton into basket assembly 24.

Control circuit 172 is also coupled to an operator interface 174 having an indicator and an input device (not shown). Operator interface 174 may include a number of indicators and display options, the display options being adjusted by the input device.

In operation, flow transducer 176 monitors or measures the flow of harvested cotton into basket assembly 24. Flow transducer 176 generates a harvested cotton flow signal indicating the flow of harvested cotton. Control circuit 172 receives the harvested cotton flow signal and calculates the cumulative volume of cotton flowing into basket assembly 24. When the cotton flow reaches a predetermined volume (i.e., near or equal to the compressed cotton volumetric capacity of basket assembly 24), control circuit 172 generates a basket level indication signal and transmits this signal to operator interface 174. Operator interface 174 indicates to the operator that basket assembly is full or approximately full via a lamp, buzzer, or other indicator. Alternatively, control circuit 172 can generate a basket level indication signal continuously (e.g., in an embodiment wherein the predetermined volume is a first measurable trace of harvested cotton), thereby providing a constant indication to the operator via operator interface 174 of the volume of cotton harvested. In this alternate embodiment, the operator can determine, based on the indication and based on prior experience, how soon basket assembly 24 will be full and in need of unloading. Operator interface 174 may further optionally include an input device operable by the operator to select between various display options. For example, the operator could select between receiving a buzzer indication when basket assembly 24 is full and receiving a constant indication of the volume of cotton in basket assembly 24.

It is understood that, while detailed drawings and specific examples given describe exemplary embodiments of the present invention, they are for the purpose of illustration only. The present invention is not limited to the precise details, methods, materials, and conditions disclosed. For example, the specific sensors and transducers expressly recited are merely exemplary of the wide range of similarly-functioning sensors and transducers that could replace those expressly recited. Also, while a harvester having a compacting assembly as shown in FIGS. 3–4 has been used as an exemplary cotton harvester, the present invention will find applications in cotton harvesters having various other compacting assemblies, other cotton harvesters and other cotton harvesting machinery. Accordingly, the present invention is not to be limited to any specific embodiments herein, but rather is to extend to all embodiments now known or later developed that fall within the spirit and scope of the present invention as defined by the claims appended hereinafter.

What is claimed is:

1. A basket level indicator apparatus for a cotton harvester, the cotton harvester having a basket assembly into which the harvester moves harvested cotton and a compacting assembly coupled to the basket assembly having a motor and a compaction member, the motor driving the compaction member to compress the harvested cotton, the harvested cotton exerting a pressure on the motor, the apparatus comprising:

a transducer coupled to the motor to measure the pressure exerted by the harvested cotton on the compaction member and to generate a pressure signal representative of the exerted pressure;

a control circuit coupled to the transducer to receive the pressure signal and to generate a basket level indication signal a predetermined time after the pressure signal indicates a predetermined pressure is measured; and an indicator coupled to the control circuit, the indicator to receive the basket level indication signal and provide an indication of the level of harvested cotton in the basket assembly based on the basket level indication signal.

2. The basket level indicator apparatus of claim 1, the motor being a hydraulic motor having a hydraulic conduit and the transducer being a pressure transducer, wherein the pressure signal is a signal representative of hydraulic pressure.

3. The basket level indicator apparatus of claim 1, the motor being an electric motor having a power source, wherein the transducer monitors the electric power applied to the motor such that the pressure signal is a signal representative of motor torque.

4. The basket level indicator apparatus of claim 1, further comprising a timer input device coupled to the control circuit, the input device to generate a control signal, the control circuit to receive the control signal and adjust the predetermined time based on the control signal.

5. The basket level indicator apparatus of claim 1, wherein the transducer has a first predetermined threshold and a second predetermined pressure threshold, the first predetermined threshold being lower than the second predetermined pressure threshold, the transducer generating the pressure signal at a first state when the exerted pressure drops below the first predetermined pressure threshold and at a second state when the exerted pressure rises above the second predetermined pressure threshold.

6. The basket level indicator apparatus of claim 5, wherein the control circuit generates the basket level indication signal when the pressure signal is at the second state for the predetermined time.

7. The basket level indicator apparatus of claim 1, wherein the control circuit generates the basket level indication signal when the pressure signal indicates the basket assembly is approximately full.

8. The basket level indicator apparatus of claim 1, wherein the pressure signal represents a continuous indication of the exerted pressure, the control circuit generates the basket level indication signal to represent a continuous indication of the exerted pressure, and the indicator displays a continuous indication of the exerted pressure.

9. The basket level indicator apparatus of claim 1, the compacting assembly having a second motor and a second compaction member, the second motor driving the second compaction member to compress the harvested cotton, the harvested cotton exerting a second pressure on the second motor, further comprising:

a second transducer coupled to the second motor to measure the second pressure exerted by the harvested cotton on the second compaction member and to generate a second pressure signal representative of the second exerted pressure, wherein the control circuit is coupled to the second transducer to receive the second pressure signal and to generate the basket level indication signal based on the pressure signal and the second pressure signal.

10. A method of indicating the level of harvested cotton in a basket assembly of a cotton harvester, the cotton harvester having a basket assembly into which the harvester moves harvested cotton and a compacting assembly coupled to the basket assembly having a motor and a compaction member, the motor driving the compaction member to compress the harvested cotton, the harvested cotton exerting a pressure on the compaction motor, the method comprising:

measuring the pressure exerted by the harvested cotton on the compaction member;

generating a signal representative of the exerted pressure;

generating a basket level indication signal when the pressure signal indicates the basket assembly is approximately full; and providing an indication of the level of harvested cotton in the basket assembly based on the basket level indication signal.

11. The method of claim 10, wherein the step of generating a basket level indication signal includes generating the basket level indication signal a predetermined time after the pressure signal indicates a predetermined pressure is measured.

12. The method of claim 11, further comprising adjusting the predetermined time based on an operator-adjustable timer input device.

13. The method of claim 10, the motor being a hydraulic motor having a hydraulic conduit, wherein the step of measuring includes measuring the pressure in the hydraulic conduit.

14. The method of claim 10, the motor being an electric motor having a power source, wherein the step of measuring includes measuring the electric power applied to the motor.

15. A basket level indicator apparatus for a cotton harvester, the cotton harvester having a basket assembly into which the harvester moves harvested cotton and a compacting assembly coupled to the basket assembly having a motor and a compaction member, the motor driving the compaction member to compress the harvested cotton, the harvested cotton exerting a pressure on the motor, the apparatus comprising:

means for measuring the exerted pressure and for generating a signal representative of the measured pressure;

means for generating a basket level indication signal when the pressure signal indicates the basket assembly is approximately full; and means for providing an indication of the level of harvested cotton in the basket assembly based on the basket level indication signal.

16. The basket level indicator apparatus of claim 15, wherein the means for generating includes means for generating the basket level indication signal a predetermined time after the pressure signal indicates a predetermined pressure is measured.

17. The basket level indicator apparatus of claim 16, further comprising means for adjusting the predetermined time based on operator input.

18. The basket level indicator apparatus of claim 15, the means for measuring including a pressure transducer.

19. The basket level indicator apparatus of claim 15, the means for measuring including a power transducer.

20. The basket level indicator apparatus of claim 15 wherein the means for generating includes a timer module.

* * * * *